(12) United States Patent
Setlur et al.

(10) Patent No.: US 7,128,849 B2
(45) Date of Patent: Oct. 31, 2006

(54) PHOSPHORS CONTAINING BORON AND METALS OF GROUP IIIA AND IIIB

(75) Inventors: Anant Achyut Setlur, Niskayuna, NY (US); Alok Mani Srivastava, Niskayuna, NY (US); Holly Ann Comanzo, Niskayuna, NY (US); Venkatesan Manivannan, Rexford, NY (US)

(73) Assignee: General Electric Company, Niskayuna, NY (US)

( * ) Notice: Subject to any disclaimer, the term of this patent is extended or adjusted under 35 U.S.C. 154(b) by 258 days.

(21) Appl. No.: 10/697,930

(22) Filed: Oct. 31, 2003

(65) Prior Publication Data

US 2005/0092968 A1 May 5, 2005

(51) Int. Cl.
 $C09K$ $11/63$ (2006.01)
 $C09K$ $11/80$ (2006.01)
 $H01J$ $1/36$ (2006.01)
 $H01J$ $61/20$ (2006.01)

(52) U.S. Cl. .................. 252/301.4 R; 252/301.4 H; 252/301.4 P; 313/486; 313/487; 313/639

(58) Field of Classification Search .................... None
 See application file for complete search history.

(56) References Cited

U.S. PATENT DOCUMENTS 4,512,912 A * 4/1985 Matsuda et al. ...... 252/301.6 S
4,604,540 A * 8/1986 Fukami .................. 310/154.06
6,509,685 B1 * 1/2003 Justel et al. ................. 313/486
6,517,741 B1 * 2/2003 Feldmann et al. .... 252/301.4 F
6,673,473 B1 * 1/2004 Letschert .................... 428/690
6,676,853 B1 * 1/2004 Ueda et al. ........... 252/301.4 R

FOREIGN PATENT DOCUMENTS

| EP | 406554 | * | 1/1991 |
| EP | 1429369 | | 6/2004 |
| JP | 56-155281 | * | 12/1981 |
| JP | 56-155282 | * | 12/1981 |
| JP | 2000-290648 | * | 10/2000 |

OTHER PUBLICATIONS

S. Shionoya and W.M. Yen, "Phosphor Handbook," pp. 389-432, CRC Press, Boca Raton (1999).

* cited by examiner

*Primary Examiner*—C. Melissa Koslow
(74) *Attorney, Agent, or Firm*—Fletcher Yoder

(57) ABSTRACT

A phosphor comprises: (a) at least a first metal selected from the group consisting of yttrium and elements of lanthanide series other than europium; (b) at least a second metal selected from the group consisting of aluminum, gallium, indium, and scandium; (c) boron; and (d) europium. The phosphor is used in light source that comprises a UV radiation source to convert UV radiation to visible light.

14 Claims, 3 Drawing Sheets

PHOSPHORS CONTAINING BORON AND METALS OF GROUP IIIA AND IIIB

This invention was first conceived or reduced to practice in the performance of work under contract DE-FC26-99FT40632 awarded by the United States Department of Energy. The United States of America may have certain rights to this invention.

BACKGROUND OF THE INVENTION

This invention relates to photoluminescent materials or phosphors and to lighting technology. In particular, this invention relates to phosphors containing boron and metals of Groups IIIA and IIIB, and to light sources incorporating such phosphors.

A phosphor is a luminescent material that absorbs radiation energy in a portion of the electromagnetic spectrum and emits energy in another portion of the electromagnetic spectrum. Phosphors of one important class are crystalline inorganic compounds of high chemical purity and of controlled composition to which small quantities of other elements (called "activators") have been added to convert them into efficient fluorescent materials. With the right combination of activators and inorganic compounds, the color of the emission can be controlled. Most useful and well-known phosphors emit radiation in the visible portion of the electromagnetic spectrum in response to excitation by electromagnetic radiation outside the visible range. Well-known phosphors have been used in mercury vapor discharge lamps to convert ultraviolet ("UV") radiation emitted by the excited mercury vapor to visible light. Other phosphors are capable of emitting visible light upon being excited by electrons (used in cathode ray tubes) or X rays (for example, scintillators in X-ray detection systems).

Fluorescent lamps having high luminous output and color rendering indices ("CRI"), which are based on mercury discharge and used for illumination, typically include three phosphors that convert UV radiation of the mercury discharge into relatively narrow bands of blue, green, and red visible light, concentrated in the spectral regions where the human eye has the highest sensitivity (450, 540, and 610 nm). Europium-activated yttrium oxide ($Y_2O_3:Eu^{3+}$) has been a favorite red light-emitting phosphor, having a peak emission at about 613 nm. However, the manufacture of this phosphor requires a high-purity $Y_2O_3$ because impurities, such as iron, in $Y_2O_3$ tend to act as competing absorbing centers for the 254 nm radiation. Other red light-emitting phosphors have also been used, but each has a certain drawback. $6MgO \cdot As_2O_5:Mn^{2+}$ and $3.5MgO \cdot 0.5MgF_2 \cdot GeO_2:Mn^{4+}$ have peak emission in the deep red region at about 655 nm, reducing the luminous output of light sources using these phosphors. In addition to having an emission peak at about 630 nm, $GdMgB_5O_{10}$: $Ce^{3+},Mn^{2+}$ emits broadly in the wavelength range of 580–700 nm. Thus, this phosphor does not easily provide a high CRI. Similarly, $(Sr,Mg)_3(PO_4)_2:Sn^{2+}$ has an emission peak at 630 nm, and emits even more broadly than $GdMgB_5O_{10}:Ce^+,Mn^{2+}$, from about 540 nm to about 720 nm. A more recent addition to the red light-emitting phosphors is $YVO_4:Eu^{3+}$, which has two peaks at about 607 nm and 619 nm. However, this phosphor also has a substantial emission at about 592 nm. In addition, residual, unreacted $V_2O_5$ in this phosphor lowers its light output. Other red light-emitting phosphors, such as $GdAlO_3:Eu^{3+}$ and $Y_2O_2S$: $Eu^{3+}$ have been proposed for light sources. However, the long-term stability of these phosphors in a mercury discharge needs to be improved.

Therefore, there is a continued need for new red light-emitting phosphors that emits in a narrow band near 610 nm, at which the human eye is more sensitive, and that does not impose special requirements in their manufacture. It is also very desirable to use such red light-emitting phosphors to produce light sources having high CRIs.

SUMMARY OF THE INVENTION

The present invention provides phosphors that comprise metals of Groups IIIA and IIIB of the Periodic Table of the elements.

In one embodiment, a phosphor of the present invention comprises: (a) at least a first metal selected from the group consisting of yttrium and the lanthanide series other than europium; (b) at least a second metal selected from the group consisting of aluminum, gallium, indium, and scandium; (c) boron; and (d) europium.

In another embodiment, a phosphor of the first metal, the second metal, boron, and europium are present in combined form with oxygen.

According to one aspect of the present invention, the phosphor has a formula of $(D_{1-x}Eu_x)A_3B_4O_{12}$; wherein D is at least a metal selected from the group consisting of yttrium and elements of the lanthanide series other than europium; A is at least a metal selected from the group consisting of aluminum, gallium, indium, and scandium; and x is in a range from about 0.001 to about 0.3.

According to another aspect, the present invention provides a method for making a phosphor. The method comprises: (a) mixing oxygen-containing compounds of: (1) at least a first metal selected from the group consisting of yttrium and the lanthanide series other than europium; (2) at least a second metal selected from the group consisting of aluminum, gallium, indium, and scandium; (3) boron; and (4) europium to form a mixture; and (b) heating the mixture in an oxygen-containing atmosphere at a temperature in a range from about 900° C. to about 1400° C. for a time sufficient to convert the mixture to the phosphor.

According to another aspect, a method for making a phosphor comprises: (a) providing a first solution that comprises: (1) at least a compound of at least a first metal selected from the group consisting of yttrium and the lanthanide series other than europium; (2) at least a compound of a second metal selected from the group consisting of aluminum, gallium, indium, and scandium; (3) a compound of boron; and (4) a compound of europium; (b) combining the first solution and a second solution, the second solution comprising at least a compound selected from the group consisting of ammonium hydroxide; hydroxides of at least one element selected from the group consisting of said at least a first metal, said at least a second metal, boron, and europium; organic esters; and organic amines to produce a precipitate; (b) heating the precipitate in an oxygen-containing atmosphere at a temperature in a range from about 900° C. to about 1400° C. for a time sufficient to convert the mixture to the phosphor.

According to still another aspect, a visible light source comprises: (a) a source of UV radiation; and (b) a phosphor comprising: (1) at least a first metal selected from the group consisting of yttrium and the lanthanide series other than europium; (2) at least a second metal selected from the group consisting of aluminum, gallium, indium, and scandium; (3) boron; and (4) europium; wherein the phosphor absorbs at least a portion of the UV radiation and emits visible light.

Other features and advantages of the present invention will be apparent from a perusal of the following detailed description of the invention and the accompanying drawings in which the same numerals refer to like elements.

Figure 1:
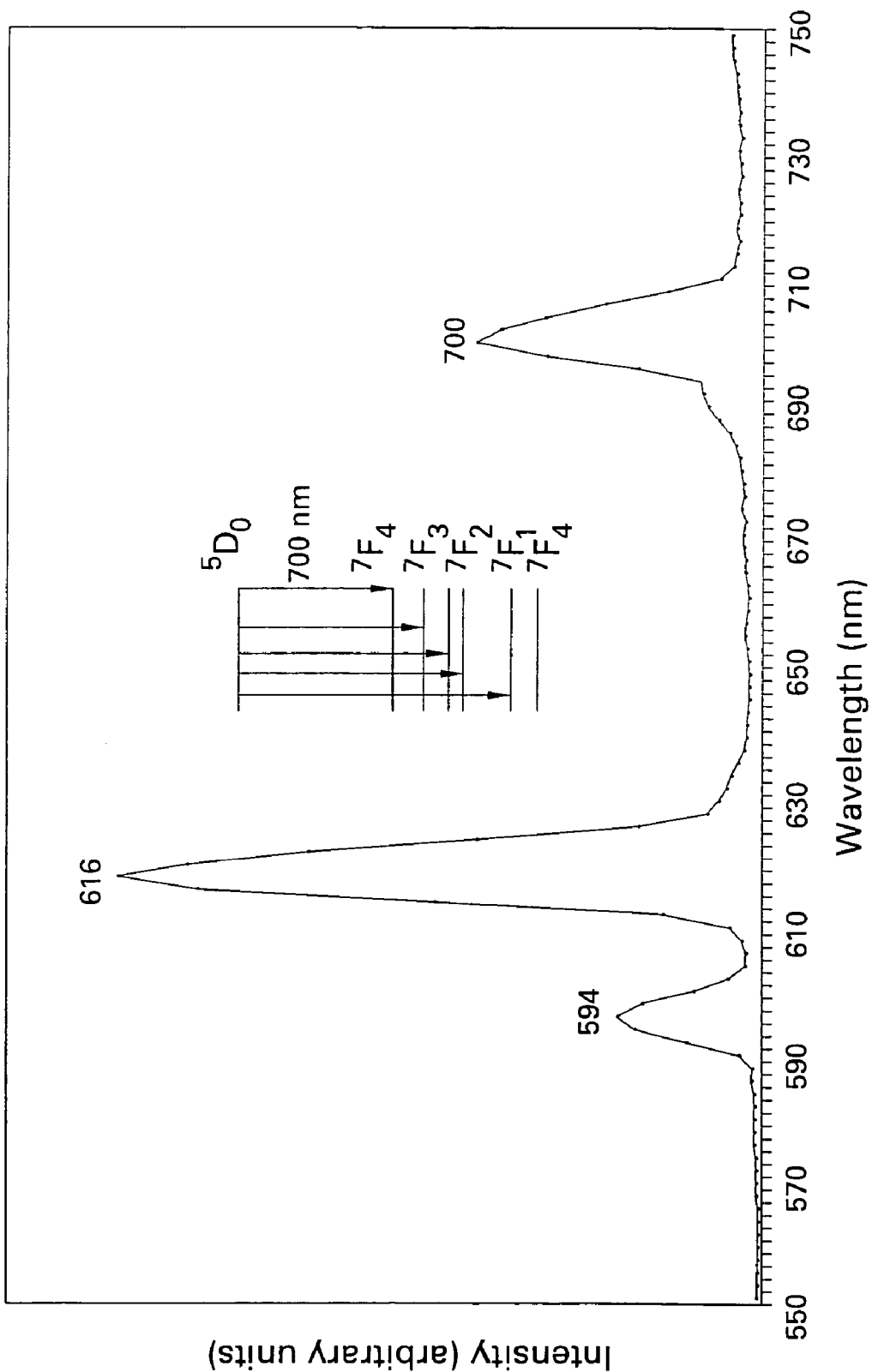
FIG. 1 shows the emission spectrum of $(Y_{0.9}Eu_{0.1})Al_3B_4O_{12}$ phosphor.

It should be understood that the drawings are included only for illustration purposes, are not intended to limit the invention in any way, and are not drawn to scale.

DETAILED DESCRIPTION OF THE INVENTION

In general, the present invention provides phosphors that comprise metals of Group IIIA and IIIB of the Periodic Table. The phosphors are excitable by radiation in the UV range (i.e., having wavelengths in the range from about 200 nm to about 400 nm) to emit in the red-light wavelengths (i.e., from about 600 nm to about 770 nm), preferably from about 600 nm to about 700 nm. Further, chemical formulae are used to represent materials in such a way that, whenever more than two elements are included within a parenthesis, it implies that at least one of the elements need to be present in the material.

In one embodiment of the present invention, the phosphors emit substantially in the wavelength range from about 590 nm to about 710 nm. The greatest portion of light emitted by a phosphor of the present invention, as measured by the luminous output, has wavelengths in the range from about 610 nm to about 630 nm.

A phosphor of the present invention comprises: (a) at least a first metal selected from the group consisting of yttrium and elements of the lanthanide series other than europium; (b) at least a second metal selected from the group consisting of aluminum, gallium, indium, and scandium; (c) boron; and (d) europium.

According to one aspect of the present invention, the phosphor has a formula of $(D_{1-x}Eu_x)A_3B_4O_{12}$; wherein D is at least a metal selected from the group consisting of yttrium and elements of the lanthanide series other than europium; A is at least a metal selected from the group consisting of aluminum, gallium, indium, and scandium; and x is in a range from about 0.001 to about 0.3, preferably from about 0.01 to about 0.2, and more preferably from about 0.05 to about 0.2.

In one embodiment, D is at least a metal selected from the group consisting of Y, La, Ce, Pr, Sm, Gd, Tb, and Lu.

In another embodiment, D is at least a metal selected from the group consisting of Y, La, Gd, and Lu.

In still another embodiment, D is a combination of Y and Gd, and A is Al.

In still another embodiment, D is a combination of Y and Gd, and A is a combination of Al, Ga, and Sc.

A phosphor of the present invention can be produced by a dry method or a wet method. The dry method comprise: (a) mixing oxygen-containing compounds of: (1) at least a first metal selected from the group consisting of yttrium and the lanthanide series other than europium; (2) at least a second metal selected from the group consisting of aluminum, gallium, indium, and scandium; (3) boron; and (4) europium to form a mixture; and (b) heating the mixture in an oxygen-containing atmosphere at a temperature in a range from about 900° C. to about 400° C. for a time sufficient to convert the mixture to the phosphor. A heating time in a range from about 1 minute to about 10 hours is adequate. It should be noted that the heating time can depend on the amount of material being treated to produce the phosphor, or on the extent of contact between the solid and the oxygen-containing atmosphere, or on the degree of mixing while the mixture is heated. Preferably, the temperture is in the range from about 900 ° C. to about 1200° C.

The mixture can be rapidly brought to and held at the final temperature. Alternatively, the mixture may be heated up to the final temperature at a lower rate, such as from about 10° C./minute to about 200° C./minute, preferably from about 10° C./minute to about 100° C./minute.

The oxygen-containing compounds may be selected from the group consisting of oxides, carbonates, nitrates, sulfates, phosphates, citrates, carboxylates (salts of carboxylic acids), and combinations thereof. Lower carboxylates (e.g., having from one to five carbon atoms, inclusive), such as acetates, may be desirable.

The oxygen-containing atmosphere can be air; oxygen; a mixture of oxygen and an inert gas selected from the group consisting of nitrogen, helium, argon, krypton, xenon, and combinations thereof; $NO_x$; or $SO_x$. The oxygen-containing atmosphere can comprise a gas that decomposes to give an oxygen-containing compound at the heating temperature.

According to another aspect of the present invention, the oxygen-containing compound of boron is $H_3BO_3$, which can act as a flux compound during the heating of the mixture.

According to another aspect of the present invention, the method further comprises adding at least a halide compound of a metal selected from the group consisting of said at least a first metal, said at least a second metal, and europium into the mixture before heating the mixture to produce the phosphor. In one embodiment, the halide compound is a fluoride. The halide compound acts as a flux during the heating step and can comprise up to about 10 percent by weight of the mixture.

The oxygen-containing compounds may be mixed together by any mechanical method including, but not limited to, stirring or blending in a high-speed blender or a ribbon blender. The oxygen-containing compounds may be combined and pulverized together in a bowl mill, a hammer mill, or a jet mill. The mixing may be carried out by wet milling especially when the mixture of the oxygen-containing compounds is to be made into a solution for subsequent precipitation. If the mixture is wet, it may be dried first before being heated to a temperature in the range from about 900° C. to about 1400° C. The drying may be carried out at ambient atmosphere or under a vacuum. The heating may be conducted in a batchwise or continuous process, preferably with a stirring or mixing action to promote good gas-solid contact. The firing time depends on the quantity of the mixture to be fired, the rate of gas conducted through the firing equipment, and the quality of the gas-solid contact in the firing equipment. Typically, a heating time from about 1 minute to about 10 hours is adequate.

EXAMPLE

The following quantities of oxygen-containing compounds were dry blended thoroughly:

$Gd_2O_3$: 3.442 g $Eu_2O_3$: 0.3713g $Al_2O_3$: 3.227 g $H_3BO_3$: 5.8707 g (about 33.8% by weight excess)

The temperature was ramped up at a rate of about 100° C./minute to between 1000° C. and 1200° C. The mixture was heated for a total time of about 4 hours in an alumina crucible in air. After heating, the resulting material was washed in hot water to remove any unreacted boric acid, and dried. The phosphor has a composition of $Gd_{0.9}Eu_{0.1}Al_3B_4O_{12}$. The dried material was milled to median particle size of about 6 μm for further testing.

Other phosphors of the present invention can be prepared by the same dry method or by the wet method disclosed above. Table 1 shows the quantum efficiency of some phosphors of the present invention. The quantum efficiency reported herein is a relative number compared to a $Y_2O_3$: $Eu^{3+}$ standard emitting in the red region.

TABLE 1

| Composition | Preparation Method | Firing Temperature (° C.) | Quantum Efficiency (% of standard phosphor) | Absorbance (% of standard phosphor) | Notes |
|---|---|---|---|---|---|
| $(Y_{0.95}Eu_{0.05})Al_3B_4O_{12}$ | dry | 1200 | 73 | 63 | 2% excess $H_3BO_3$ |
| $(Y_{0.9}Eu_{0.1})Al_3B_4O_{12}$ | dry | 1200 | 74 | 78 | 2% excess $H_3BO_3$ |
| $(Y_{0.875}Eu_{0.125})Al_3B_4O_{12}$ | dry | 1200 | 69 | 81 | 2% excess $H_3BO_3$ |
| $(Y_{0.8}Eu_{0.2})Al_3B_4O_{12}$ | dry | 1200 | 71 | 81 | 2% excess $H_3BO_3$ |
| $(Y_{0.95}Eu_{0.05})Al_3B_4O_{12}$ | wet | 1150 | 68 | 58 | 2% excess $H_3BO_3$ |
| $(Y_{0.9}Eu_{0.1})Al_3B_4O_{12}$ | wet | 1150 | 70 | 67 | 2% excess $H_3BO_3$ |
| $(Y_{0.8}Eu_{0.2})Al_3B_4O_{12}$ | wet | 1150 | 69 | 67 | 2% excess $H_3BO_3$ |

The wet method of preparation of a phosphor of the present invention comprises: (a) providing a first solution that comprises: (1) at least a compound of at least a first element selected from the group consisting of yttrium and elements of lanthanide series other than europium; (2) at least a compound of at least a second element selected from the group consisting of aluminum, gallium, indium and scandium; (3) at least a compound of boron; and (4) at least a compound of europium; (b) adding a second solution to the first solution to produce a precipitate comprising compounds of the first element, the second element, boron, and europium; the second solution comprising a base selected from the group consisting of ammonium hydroxide; hydroxides of at least one element selected from the group consisting of yttrium, elements of lanthanide series; organic esters of carboxylic acids; organic amines; and combinations thereof; and (c) heating the precipitate in an oxygen-containing atmosphere at a temperature in a range from about 900° C. to about 1400° C. for a time sufficient to convert the precipitate to the phosphor. In one embodiment, the second element is selected from the group consisting of Y, Ce, Pr, Sm, La, Gd, Tb, Lu, and combinations thereof. In another embodiment, the second element is selected from the group consisting of Gd, Y, Sm, La, Lu, and combinations thereof. In still another embodiment, the second element is a combination of Y and Gd.

In one embodiment, the first solution is simply an aqueous solution if the compounds of the first element, the second element, europium, and boron are readily dissolved in water.

In another embodiment, oxides or other oxygen-containing compounds of at least one of the first elements, at least one of the second elements, europium, and boron are dissolved in an acidic solution, such as hydrochloric acid, nitric acid, sulfuric acid, citric acid, or acetic acid. The strength of the acid solution is chosen to rapidly dissolve the oxides or the oxygen-containing compounds, and the choice is within the skill of a person skilled in the art. Ammonium hydroxide is then added in increments to the acidic solution containing the first element, the second element, europium, and boron while stirring to precipitate a mixture of hydroxides of the first element, the second element, europium, and boron. An organic base; such as methanolamine, ethanolamine, propanolamine, dimethanolamine, diethanolamine, dipropanolamine, trimethanolamine, triethanolamine, or tripropanolamine; may be used in place of ammonium hydroxide. Alternatively, an ester of an organic acid may be used to carry out the precipitation; such as methyl, ethyl, or propyl esters of acetic acid, propionic acid, butyric acid, oxalic acid, malonic acid, succinic acid, or glutaric acid; dimethyl, diethyl, dipropyl esters of oxalic acid, malonic acid, succinic acid, or glutaric acid. The precipitate is filtered, washed with deionized water, and optionally dried. The dried precipitate is ball milled or otherwise thoroughly blended and then heated in an oxygen-containing atmosphere at a temperature in the range from about 900° C. to about 1400° C., preferably from about 900° C. to about 1200° C. Alternatively, the wet precipitate can be heated first, and then ball milled or otherwise thoroughly blended afterward.

White Light-emitting Device

Figure 2:
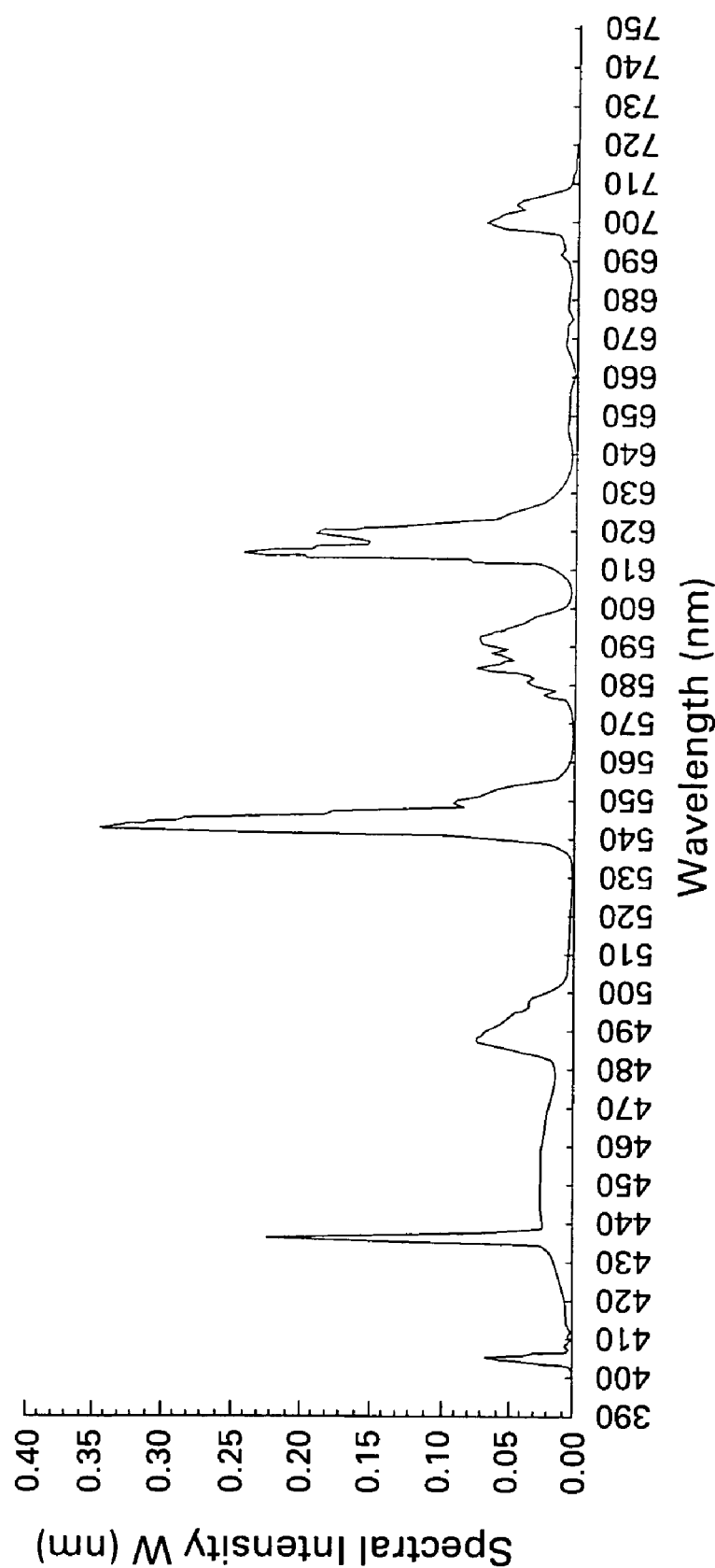
FIG. 2 shows the composite emission spectrum of $(Y_{0.9}Eu_{0.1})Al_3B_4O_{12}$ (red light-emitting); $LaPO_4:Ce^{3+},Tb^{3+}$ (green light-emitting); and $(Ba,Sr,Ca)MgAl_{10}O_{17}:Eu^{2+}$ (blue light-emitting).

Incorporation of a blend of phosphors that comprises a red light-emitting phosphor of the present invention (as has been disclosed herein above), a green light-emitting phosphor, and a blue light-emitting phosphor in a mercury discharge device provides a white light-emitting device that can have a correlated color temperature ("CCT") in the range of 2500–10000 K, and a CRI in the range of 80–95. For example, a blend of phosphors consisting of $(Y_{0.9}Eu_{0.1})Al_3B_4O_{12}$ (red light-emitting); $LaPO_4:Ce^{3+},Tb^{3+}$ (green light-emitting); and $(Ba,Sr,Ca)MgAl_{10}O_{17}:Eu^{2+}$ (blue light-emitting) produces a composite spectrum shown in FIG. 2. The proportions of the individual phosphors are such that 41.3, 45.3, and 13.4% of the composite spectrum are contributed by the phosphors $(Y_{0.9}Eu_{0.1})Al_3B_4O_{12}$; $LaPO_4:Ce^{3+},Tb^{3+}$; and $(Ba,Sr,Ca)MgA_{10}O_{17}:Eu^{2+}$; respectively This phosphor blend produces white light having a CCT of 4000 K, and a CRI of 87.

Non-limiting examples of other green light-emitting phosphors that may be used in a blend with a phosphor of the present invention are $GdMgB_5O_{10}:Ce^{3+},Tb^{3+}$; $CeMgAl_{11}O_{19}:Ce^{3+},Tb^{3+}$; $Ca_5(PO_4)_3(Cl,F,OH):Sb^{3+},Mn^{2+},Eu^{2+}$; $Sr_4Al_{14}O_{25}:Eu^{2+}$; and $BaAl_8O_{13}:Eu^{2+}$; and combinations thereof.

Non-limiting examples of other blue light-emitting phosphors are $(Ba,Sr,Ca)_5(PO_4)_3(Cl,F,OH):Eu^{2+}$; $(Ba,Sr,Ca)BPO_5:Eu^{2+}$; and combinations thereof.

Green light-emitting phosphors used in a phosphor blend of the present invention preferably emit light having a peak emission in the range from about 500 nm to about 560 nm. Blue light-emitting phosphors used in a phosphor blend of the present invention preferably emit light having a peak emission in the range from about 420 nm to about 500 nm. Red light-emitting phosphors, other than a phosphor of the present invention, can be used additionally in a phosphor blend. Such red light-emitting phosphors preferably emit light having a peak emission in the wavelength range from about 600 nm to about 625 nm.

Figure 3:
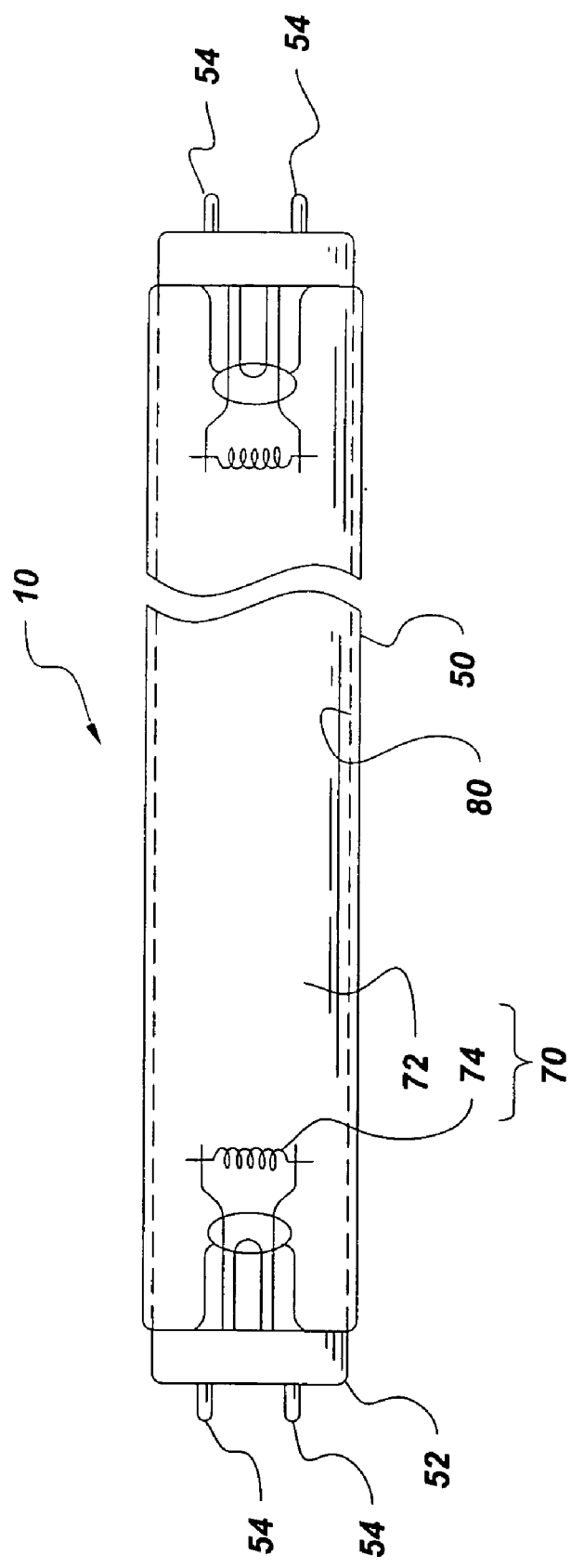
FIG. 3 shows schematically a light source that incorporates a phosphor of the present invention.

In one embodiment of the present invention, a light source 10, which produces white light with a high CRI suitable for general illumination (e.g., CRI in the range from about 80 to about 100), is shown in FIG. 3. Light source 10 comprises an evacuated sealed housing 50, a means 70 for generating UV radiation, which means is located within housing 50, and a phosphor blend 80 located within housing 50 and adapted to be excited by UV radiation. In one embodiment, light source 10 is a fluorescent lamp and evacuated housing 50 comprises an evacuated glass tube and associated end caps 52. In another embodiment, the phosphor blend is disposed on an inner surface of housing 50. Means 70 for generating UV radiation is a combination of a gas comprising a means 74 for generating high-energy electrons and a means 72 for absorbing the energy of the high-energy electrons. In one embodiment, means 72 for absorbing energy of high-energy electrons is a gas comprising mercury vapor, which absorbs energy of the high-energy electrons to create a mercury vapor discharge to excite the phosphor. In addition to mercury vapor, the gas can comprise an inert gas such as argon, krypton, or xenon. Means 74 for generating high-energy electrons may be a filament of a metal having a low work function (such as less than 4.5 eV), such as tungsten, or such a filament coated with alkaline earth metal oxides as are known in the art. Pins 54 are provided to supply electrical power to electron-generating means 74. The filament is coupled to a high-voltage source to generate electrons from the surface thereof. A phosphor of the present invention may be used in combination with other conventional phosphors used in fluorescent lighting technology. For example, a phosphor of the present invention may be combined with conventional red, green, and blue light-emitting phosphors, which conventional phosphor are disclosed herein above, to produce white light from a mercury discharge lamp. A particulate material comprising $TiO_2$ and/or $Al_2O_3$ can be used in conjunction with the phosphor blend to scatter light generated by light source 10. Such a light scattering material can be blended into the phosphor blend or disposed as a layer between the inner surface of housing 50 and phosphor layer 80. Although light source 10 shown in FIG. 3 comprises a straight housing 50, it should be understood that other housing shapes also are applicable. For example, a compact fluorescent lamp can have a housing that has one or more bends, and electrical supply pins 54 are disposed at one end of light source 10.

A red light-emitting phosphor of the present invention also can be used as a component of a phosphor blend for cathode-ray tubes, which phosphor blend comprises blue light-emitting and green light-emitting phosphors. In this case, the high-energy electrons bombard a screen on which a coating of the phosphor blend is disposed to emit light in the visible spectral region.

While specific preferred embodiments of the present invention have been described in the foregoing, it will be appreciated by those skilled in the art that many modifications, substitutions, or variations may be made thereto without departing from the spirit and scope of the invention as defined in the appended claims.

What is claimed is:

1. A phosphor having a formula of $(D_{1-x}Eu_x)A_3B_4O_{12}$; wherein D is a combination of yttrium and gadolinium A is a combination of aluminum, scandium, and gallium; and x is in a range from about 0.001 to about 0.3.

2. The phosphor according to claim 1, wherein x is in a range from about 0.01 to about 0.2.

3. A phosphor blend comprising: (a) a phosphor having a formula of $(D_{1-x}Eu_x)A_3B_4O_{12}$; wherein D is a combination of Y and Gd, and A is a combination of Al, Sc, and Ga; and x is in a range from about 0.00 1 to about 0.3; (b) a green light-emitting phosphor; and (c) a blue light-emitting phosphor.

4. The phosphor blend according to claim 3, wherein x is in a range form about 0.01 to about 0.2.

5. The phosphor blend according to claim 3, wherein the green light-emitting phosphor is selected from the group consisting of $LaPO_4:Ce^{3+},Tb^{3+}$; $GdMgB_5O_{10}:Ce^{3+},Tb^{3+}$; $CeMgAl_{11}O_{19}:Ce^{3+},Tb^{3+}$; $Ca_5(PO_4)_3(Cl,F,OH):Sb^{3+},Mn^{2+},Eu^{2+}$; $Sr_4Al_{14}O_{25}:Eu^{2+}$; and $BaAl_8O_{13}:Eu^{2+}$; and combinations thereof.

6. The phosphor blend according to claim 3, wherein the blue light-emitting phosphor is selected from the group consisting of $(Ba,Sr,Ca)MgAl_{10}O_{17}:Eu^{2+}$; $(Ba,Sr,Ca)_5(PO_4)_3(Cl,F,OH):Eu^{2+}$; $(Ba,Sr,Ca)BPO_5:Eu^{2+}$; and combinations thereof.

7. A method for making a phosphor, the method comprising:
   (a) mixing oxygen-containing compounds of:
      (1) at least one first metal selected from the group consisting of yttrium and elements of lanthanide series other than europium;
      (2) at least one second metal selected from the group consisting of aluminum, gallium, indium, and scandium;
      (3) boron; and
      (4) europium to form a mixture; and
   (b) heating the mixture in an oxygen-containing atmosphere at a temperature in a range from about 900° C. to about 1400° C. for a time sufficient to convert the mixture to a phosphor, wherein the phosphor comprises a material having a formula of $(D_{l-x}Eu_x)A_3B_4O_{12}$, where D is at least one metal selected from the group consisting of yttrium and elements of the lanthanide series other than europium; A is at least one metal selected from the group consisting of aluminum, gallium, indium, and scandium, and x is in a range from about 0.00 1 to about 0.3. and wherein the oxygen-containing compound of boron is $H_3BO_3$, and an amount of $H_3BO_3$ in the mixture is in excess of stoichiometric amount.

8. The method according to claim 7, further comprising washing the phosphor after heating to remove excess boron compound.

9. A method of preparation of a phosphor, the method comprising:
   (a) providing a first solution that comprises:
      (1) at least one compound of at least one first element selected from the group consisting of yttrium and elements of lanthanide series other than europium;
      (2) at least one compound of at least one second element selected from the group consisting of aluminum, gallium, indium and scandium;
      (3) at least one compound of boron; and
      (4) at least one compound of europium;
   (b) adding one second solution to the first solution to produce a precipitate comprising compounds of the first element, the second element, boron, and europium; the second solution comprising a base selected from the group consisting of ammonium hydroxide; hydroxides of at least one element selected from the group consisting of yttrium, and elements of lanthanide series; organic esters of carboxylic acids; organic amines; and combinations thereof and (c) heating the precipitate in an oxygen-containing atmosphere at a temperature in a range from about 900° C. to about 1400° C. for a time sufficient to convert the precipitate to a phosphor, wherein the phosphor comprises a material having a formula of $(D_{1-x}Eu_x)A_3B_4O_{12}$, where D is at least one of Y and a rare earth element excluding europium, and A is at least one of Al, Ga, Sc, and In, and x is in a range from about 0.001 to about 0.3.

10. A light source comprising:
(a) a source of UV radiation that is located in a sealed housing; and
(b) a phosphor blend disposed within the sealed housing and adapted to be excited by the UV radiation and to emit visible light, wherein the phosphor blend comprises: a phosphor having a formula of $(D_{1-x}Eu_x)A_3B_4O_{12}$; wherein D is a combination of Y and Gd, and A is a combination of Al, Sc, and Ga, and x is in a range from about 0.001 to about 0.3.

11. The light source according to claim 10, wherein x is in a range from about 0.01 to about 0.2.

12. The light source according to claim 10, wherein the source of UV radiation is a mercury vapor discharge.

13. The light source according to claim 10, further comprising at least a green light-emitting phosphor selected from the group consisting of $LaPO_4:Ce^{3+},Tb^{3+}$; $GdMgB_5O_{10}:Ce^{3+},Tb^{3+}$; $CeMgAl_{11}O_{19}:Ce^{3+},Tb^{3+}$; $Ca_5(PO_4)_3(Cl,F,OH):Sb^{3+},Mn^{2+},Eu^{2+}$; $Sr_4Al_{14}O_{25}:Eu^{2+}$; and $BaAl_8O_{13}:Eu^{2+}$; and combinations thereof.

14. The light source according to claim 10, further comprising at least a blue light-emitting phosphor selected from the group consisting of $(Ba,Sr,Ca)MgAl_{10}O_{17}:Eu^{2+}$; $(Ba,Sr,Ca)_5(PO_4)_3(Cl,F,OH):Eu^{2+}$; $(Ba,Sr,Ca)BPO_5:Eu^{2+}$; and combinations thereof.

* * * * *